United States Patent [19]
Luger et al.

[11] Patent Number: 5,548,961
[45] Date of Patent: Aug. 27, 1996

[54] TEMPERATURE STRATIFICATION-FREE STORAGE OF CRYOGENIC LIQUIDS

[75] Inventors: Peter Luger, Höhenkirchen; Franz Grafwallner, Tegernsee; Helmuth Peller, Höhenkirchen; Martin Müller, Höhenkirchen-Siegertsbrunn, all of Germany; Valentin V. Malyshev, Moscow, Russian Federation; Sergey B. Galperin, Moscow, Russian Federation; Viacheslav P. Logviniouk, Moscow, Russian Federation

[73] Assignees: Deutsche Aerospace AG, Munich, Germany; Tupolev AG, Moscow, Russian Federation

[21] Appl. No.: 351,835

[22] Filed: Dec. 8, 1994

[30] Foreign Application Priority Data

Dec. 10, 1993 [DE] Germany .......................... 43 42 210.1

[51] Int. Cl.$^6$ ........................................... F17C 5/02
[52] U.S. Cl. ................................. 62/47.1; 62/52.1
[58] Field of Search ......................... 62/47.1, 52.1, 62/500, 116

[56] References Cited

U.S. PATENT DOCUMENTS

| 2,790,307 | 4/1957  | Ayres ............................. 62/47.1 |
| 3,191,395 | 6/1965  | Maher et al. ..................... 62/47.1 |
| 3,800,550 | 4/1974  | Delahunty ........................ 62/47.1 |
| 3,812,683 | 5/1974  | Laverman ......................... 62/47.1 |
| 4,637,216 | 1/1987  | Shenoy et al. .................... 62/47.1 |
| 5,165,246 | 11/1992 | Cipolla et al. ................... 62/47.1 |

FOREIGN PATENT DOCUMENTS

| 57-15196A | 1/1982  | Japan .  |
| 0072799   | 4/1983  | Japan .  |
| 1195128   | 11/1985 | U.S.S.R. . |

*Primary Examiner*—Ronald C. Capossela
*Attorney, Agent, or Firm*—McGlew and Tuttle, P.C.

[57] ABSTRACT

Process for the temperature stratification-free storage of a cryogenic liquid in a thermally insulated tank under gravitation conditions or under gravitation and movement conditions, which generate a liquid volume with a clearly limited, unmoving or only moderately moving liquid level as well as with a gas space located above it in the storage volume of the tank. Liquid is pumped off from the area near the bottom of the tank continuously or at time intervals, it is fed into the area of the gas space, and it is directed vertically or at an acute angle toward the liquid level there in the form of at least one high-energy jet.

20 Claims, 1 Drawing Sheet

TEMPERATURE STRATIFICATION-FREE STORAGE OF CRYOGENIC LIQUIDS

FIELD OF THE INVENTION

The present invention pertains to a process for the temperature stratification-free storage of a cryogenic liquid in a stationary or mobile, thermally insulated tank, especially of a cryogenic fuel, such as liquid hydrogen or liquid methane, in the tank of an aircraft, under gravitation conditions or under gravitation and movement conditions, which generate a liquid volume with a clearly limited, unmoving or only moderately moving liquid level as well as with a gas space above the liquid level in the storage space of the tank.

The invention further relates to a tank for carrying out the process, the tank including a thermally insulated outer jacket, with at least one filling device and with at least one pump and a pipeline system for supplying at least one user with cryogenic liquid.

BACKGROUND OF THE INVENTION

A vertical temperature stratification develops after a certain time in cryogenic, i.e., very-low-temperature liquids which are at rest, with the topmost layer having the highest temperature. If no foreign gases are contained in the gas space located above the liquid, the pressure in that space and consequently in the entire tank space corresponds to the temperature of the topmost liquid layer, corresponding to the vapor pressure curve applicable to the liquid in question. This means that a pressure that is higher than the pressure corresponding to the mean liquid temperature occurs in the tank. This effect is manifested particularly clearly in stationary tanks, but it also occurs in mobile tanks, which are installed in, e.g., road vehicles or aircraft when the vehicles have been parked for a relatively long time or are in a relatively long, relatively smooth phase of movement without major accelerations. This effect is abolished in a more or less uncontrolled manner during rough travel/rough flight, and a sudden drop in pressure may occur. High tank pressures are disadvantageous for a material-saving tank design of favorable weight, which is used especially in aircraft, because the higher, pressure-related loads also require greater wall thicknesses. It would be possible to eliminate this problem by allowing evaporating or evaporated liquid to escape into the atmosphere by means of a pressure relief valve. However, this would effectively lead to an unintended loss of liquid as well as to environmental pollution.

Another possibility of reducing the pressure would be a continuous or periodic mixing of the amount of liquid with stirrers. Pumping over the contents of the tank could be considered as well. However, such solutions require an expensive design, a number of additional components (motors, stirring blades, pumps, pipelines, valves, etc.), and they also considerably increase the weight of the tank.

The above-mentioned pressure variations during relatively intense movements of the tank are especially disadvantageous as they cause alternating mechanical loads and lead to variations in throughput, i.e., to a nonuniform supply of downstream users.

SUMMARY AND OBJECTS OF THE INVENTION

In light of these disadvantages, the object of the present invention is to provide a process for the temperature stratification-free storage of a cryogenic liquid in a stationary or mobile, thermally insulated tank, which makes it possible to minimize the internal pressure in the tank at a low expense by homogenizing the temperature, as well as a tank design for carrying out this process, which is simple, reliable and has a favorable weight.

According to the present invention, liquid is pumped out of the area of the tank near the bottom continuously or at certain intervals of time, it is fed into the area of the gas space (above the liquid fill line), and it is sprayed in the form of at least one jet from the top onto the liquid level at high velocity of flow. An internal liquid circulation is thus created within the tank, which guarantees that the disadvantageous temperature stratification is effectively eliminated or prevented at a moderate volume flow and moderate power consumption. The cold jet impacting the liquid level at a high velocity generates intense, locally limited turbulent movements. The turbulent area is colder than the rest of the surface of the liquid level, and thus it forms a heat sink, which in turn acts as a condensation area for the evaporated or evaporating liquid. Thus, the locally limited turbulent area generates large-volume compensating flows in both the gas space and in the liquid, as a result of which homogenization of the temperature takes place relatively rapidly in the entire volume. This surprising effect was demonstrated in practical experiments.

The complexity of the design for generating this effect can be kept within reasonable limits. Only a few additional components, such as simple, short pipelines, valves, etc., are needed. The pumps already available in the suction area near the bottom of the tank may be additionally used, if desired, in a higher-capacity version, to generate the desired circulation. All the necessary components are stationarily, i.e., statically installed in the tank, and therefore they do not cause any problem, either.

The inventive process for storing a cryogenic fuel in the tank of an aircraft provides a tank which has a main chamber, which is to be filled with the fuel and is later emptied as a consequence of the fuel consumption. A smaller secondary chamber is preferably provided which is used as an intermediate storage tank and is extensively filled during the operation of the aircraft. An amount of fuel is pumped continuously or at time intervals from the area near the bottom of the main chamber into the secondary chamber, with a direction of flow at the time of its exit into the secondary chamber extending upwardly. An amount of fuel which corresponds at least to part of this amount of fuel in the upper part of the secondary chamber is returned as an amount of overflow into the main chamber, where it impacts on the liquid level in the form of at least one high-energy jet (produced via a jet pipe). An amount of fuel is continuously pumped from the area near the bottom of the main chamber into the secondary chamber, whose instantaneous mass flow ($\dot{m}_s$) is at least 1.1 times the instantaneous fuel consumption ($\dot{m}_2$) to be covered from the corresponding tank.

The tank has a thermally insulated outer jacket, with at least one filling device and with at least one pump and a pipeline system for supplying at least one user with cryogenic liquid. A fluidic connection between the area near the bottom of the tank and the area of the gas space. At least one pump is provided in this fluidic connection, as well as at least one jet pipe at the top end of this fluidic connection. The top end opens above the liquid level and is directed at right angles or at an acute angle thereto.

The opening of the jet pipe is directed at an angle of 45° to 90° to the normal position of the liquid level. The opening of the jet pipe is provided as a convergent nozzle.

A partition is preferably provided dividing the tank volume into the main chamber and the secondary chamber. At least one fore-pump in the area near the bottom of the main chamber and a line leading from the fore-pump into the secondary chamber are provided as well as at least one main pump in the secondary chamber and a line led out of the tank from the main pump, as well as an overflow leading from the secondary chamber into the main chamber. An upwardly directed exit area of the line leading from the fore-pump into the secondary chamber and by at least one jet pipe, which is arranged on the partition, leads from the upper area of the secondary chamber into the gas space, and is directed vertically or obliquely downward there. The fore-pump is designed as a jet pump based on the ejector principle and by a line leading from the main pump to the fore-pump for driving the latter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

In both figures, components which are not directly connected with the present invention, e.g., the tank insulation, filling devices, remnant emptying devices, manholes with flanges and covers, etc., are not shown for the sake of greater clarity.

Figure 1:
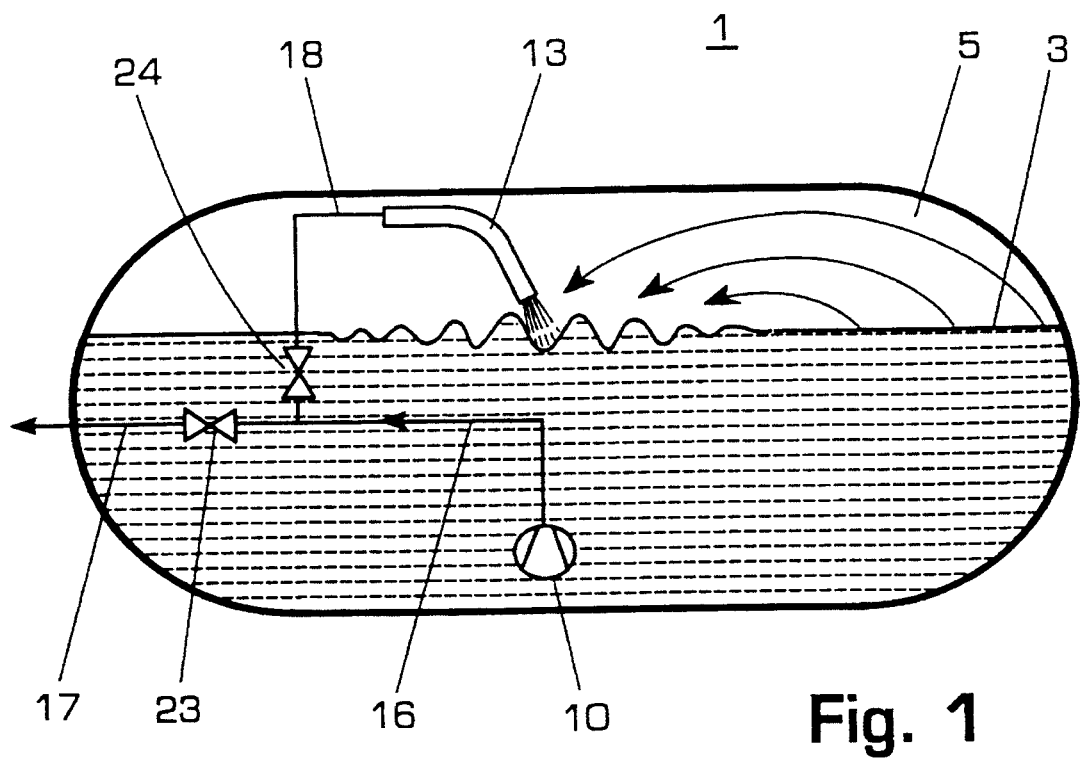
FIG. 1 is a longitudinal sectional simplified schematic view taken through a tank with a single, contiguous inner space.

The tank 1 in FIG. 1 may be, e.g., a stationary tank, in which a cryogenic liquid, i.e., a liquid cooled to a very low temperature, is temporarily stored for the purpose of consumption. Such a liquid may be, e.g., a liquefied inert gas, a cooling liquid, a fuel or an engine fuel. Users connected to the tank 1 are, e.g., welding devices, cooling devices, heating devices or engines.

To remove liquid, a pump 10, from which a line 16 originates, is arranged in the bottom area of the tank 1. After a branching of the line, one line 17 is led via a valve 23 out of the tank and to one or more users, not shown. The valve 23 can be closed and is designed, if desired, with a variably adjustable flow cross section.

Up to this point, the design corresponds to that of a prior-art tank.

A line 18 is additionally provided according to the present invention, and it leads via a valve 24 to extend into the gas space 5 above the liquid level 3. The line 18 passes over into a jet pipe 13, which is directed at an acute angle or at right angles to the liquid level. The liquid jet leaving the jet pipe 13 has sufficient kinetic energy to generate a locally limited, highly turbulent mixing zone in the upper area of the liquid volume.

Assuming that a temperature stratification with the highest temperature in the area of the liquid level 3 and with the lowest temperature in the bottom area was present in the tank 1 prior to the activation of the jet pipe 13 by means of the valve 24, the cold jet, fed with liquid from the bottom area, generates a heat sink in the form of a turbulent mixing zone. This heat sink acts as a condensation zone for the liquid vapors present in the gas space 5, as a result of which convective flow processes involving the entire gas space 5 are generated. These are indicated by three arrows 30 in the figure for the right-hand area of the tank. Large-volume flow processes, which lead to homogenization of the liquid temperature and consequently to a reduction in the pressure inside the tank in a relatively short time, also take place in the liquid volume due to the subsequent evaporation of warmer areas of liquid and as a consequence of the temperature-determined differences in density.

The pressure inside the tank can be stabilized at a low level by continuous or periodically repeated actuation of the jet pipe 13.

The jet pipe may obviously also be supplied with liquid by a separate pump, whose design and drive may have a great number of possible variants. A plurality of the jet pipes may also be present instead of a single jet pipe.

Experiments have shown that the angle of impact of the jet on the liquid level should be between 45° and 90°. An excessively flat impact of the jet (angle smaller than 45°) deteriorates the turbulent mixing effect.

Figure 2:
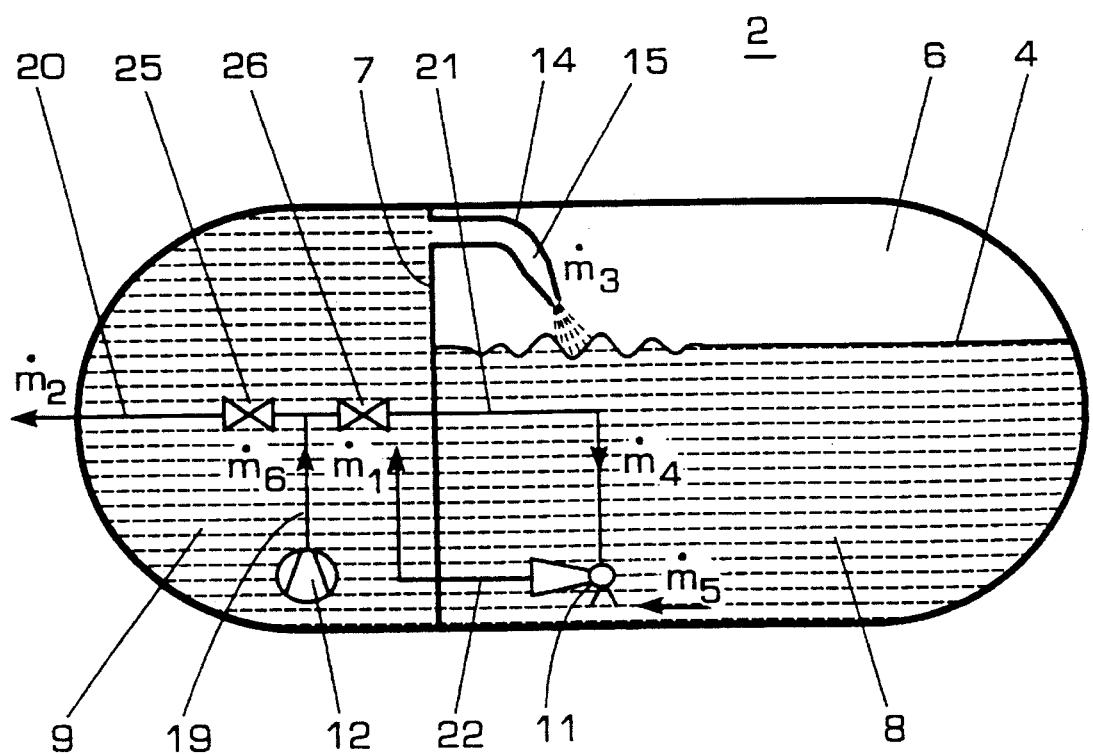
FIG. 2 is a longitudinal sectional view similar to FIG. 1 through a tank of an aircraft, which has a main chamber and a secondary chamber.

FIG. 2 shows an exemplary embodiment, which is especially adapted to the conditions prevailing in an aircraft. The tank 2 is correspondingly a fuel tank, and the cryogenic liquid is preferably liquid hydrogen ($LH_2$) or liquid natural gas (LNG, Liquid Natural Gas), which consists mainly of methane.

The tank 2 is divided by means of a partition 7 into a main chamber 8 and a secondary chamber 9, the latter having a substantially smaller volume. The fuel is delivered first from the main chamber 8 into the secondary chamber 9 and subsequently from there to one or more power units. Correspondingly, the main chamber 8 has a fore-pump 11 with a line 22, and the secondary chamber 9 has a main pump 12 with the lines 19, 20, as well as with the valve 25.

During flight, the secondary chamber 9 should always be extensively filled with fuel in order to always guarantee an uninterrupted, gas bubble-free fuel suction even under the conditions of short-term negative g. This is achieved by the fore-pump 11 always feeding somewhat more fuel into the secondary chamber 9 than is drawn off by the main pump 12 from there. The excess amount of fuel is returned as an overflow into the main chamber 8.

The features of the embodiment of FIG. 2, described up to this point have been known and consequently corresponds to the state of the art.

However, the overflow of the secondary chamber 9 is designed according to the present invention as a jet pipe 14 originating from the partition 7, which opens into the gas space 6 of the main chamber 8 above the liquid level 4 and is directed at an acute angle or at right angles to the liquid level. Also according to the present invention, the line 22 arriving from the fore-pump 11 opens into the secondary chamber 9 with an upwardly pointing direction of flow, so that a type of short-circuit flow toward the jet pipe 14 is formed in the secondary chamber 9, but the main pump 12 is, of course, also sufficiently supplied with fuel. The fore-pump 11 is designed in this case as a jet pump operating according to the ejector principle, which receives its drive power from the main pump 12. A line 21 with the valve 26 branches off for this purpose in the secondary chamber 9 from the line 19 and leads into the main chamber 8 to the fore-pump 11.

The mass balance of the tank 2 shall now also be discussed for better understanding; the relevant mass flows are designated by "$\dot{m}_1$" through "$\dot{m}_6$".

$\dot{m}_1$ is the fuel flow flowing from the fore-pump 11 into the secondary chamber 9, $\dot{m}_2$ is the instantaneous fuel consumption removed from the tank 2, $\dot{m}_3$ is the fuel flow returning into the main chamber 8 from the secondary chamber 9 through the jet pipe 14 and the convergent nozzle 15 arranged downstream to increase the velocity, $\dot{m}_4$ is the fuel flow driving the fore-pump 11, $\dot{m}_5$ is the fuel flow drawn off by the fore-pump from the main chamber 8, and finally, $\dot{m}_6$ is the fuel flow drawn off by the main pump 12 from the secondary chamber 9.

Assuming that the mass of the fuel in the secondary chamber 9 remains unchanged, and that the time-dependent reduction in mass in the main chamber 8 is equal to the fuel removed from the tank 2 for consumption, the following equations apply:

$$\dot{m}_1 = \dot{m}_4 + \dot{m}_5$$

$$\dot{m}_5 = \dot{m}_2 + \dot{m}_3$$

$$\dot{m}_6 = \dot{m}_2 + \dot{m}_4$$

$$\dot{m}_3 > 0 \text{ if } \dot{m}_5 > \dot{m}_2$$

The mass flow $\dot{m}_4$ driving the fore-pump 11 must be designed to be correspondingly strong for the latter two criteria ($\dot{m}_3 > 0$ and $\dot{m}_2$) to be met.

The fore-pump may, of course, also be designed, e.g., as a gear pump or as a centrifugal pump with its own drive (mechanical, electrical, hydraulic or pneumatic), in which case the mass flow $\dot{m}_4$ would be eliminated, i.e., it would be mathematically "zero."

While specific embodiments of the invention have been shown and described in detail to illustrate the application of the principles of the invention, it will be understood that the invention may be embodied otherwise without departing from such principles.

What is claimed is:

1. Process for the temperature stratification-free storage of a cryogenic liquid in a thermally insulated tank of a cryogenic fuel, of an aircraft, under gravitation conditions which generate a liquid volume, in a tank storage space with a clearly delimited liquid level as well as with a gas space above the liquid level, the process comprising the steps of:

pumping liquid from the area of the tank near a bottom of the tank;

feeding the pumped liquid in the form of at least one high-energy jet toward said liquid level; and generating with said jet a locally limited, highly turbulent mixing zone in an upper area of said liquid volume, wherein during said steps of pumping and feeding said liquid is maintained within the confines of said tank.

2. Process in accordance with claim 1, further comprising providing the tank with a main chamber, which is to be filled with the fuel and is later emptied as a consequence of the fuel consumption, as well as a smaller secondary chamber, which is used as an intermediate storage tank and is extensively filled during the operation of the aircraft; pumping an amount of fuel from the area near the bottom of the main chamber into the secondary chamber, with a direction of flow at the time of its exit into the secondary chamber extending upwardly, and that an amount of fuel which corresponds at least to part of this amount of fuel in the upper part of the secondary chamber is returned as an amount of overflow into the main chamber, where it impacts on the liquid level in the form of said at least one high-energy jet.

3. Process in accordance with claim 2 wherein liquid is removed from said tank in the form of continuous fuel consumption with running engines, an amount of fuel is continuously pumped from the area near the bottom of said main chamber into a secondary chamber, whose instantaneous mass flow ($\dot{m}_5$) is at least 1.1 times the instantaneous fuel consumption ($\dot{m}_2$) to be covered from the corresponding tank.

4. A process in accordance with claim 1, wherein said pump provides continuous flow to said jet means.

5. A process in accordance with claim 1, wherein said pump provides pulsed flow to said jet means.

6. A tank for the temperature stratification-free storage of a cryogenic liquid in a tank volume, the liquid having a liquid surface level and a gas space being provided in the tank volume above the liquid surface level, the tank comprising: a thermally insulated outer jacket; a pump within said tank; a pipeline system extending from within said tank to outside said tank for supplying at least one user with cryogenic liquid; a fluidic connection within said tank extending between an area near a bottom of said tank and an area of the gas space, said pump being connected in said fluidic connection; and a jet pipe connected at a top end of said fluidic connection, said jet pipe opening above the liquid surface level and being directed at an angle with respect to said liquid surface level which is in a range greater from than zero to 90°.

7. A tank in accordance with claim 6, wherein said jet pipe is directed at an angle of 45° to 90° with respect to the normal position of the liquid surface level.

8. A tank in accordance with claim 7, wherein an opening of said jet pipe is formed as a convergent nozzle for generating a high energy jet.

9. A tank in accordance with claim 6, wherein an opening of said jet pipe is formed as a convergent nozzle for generating a high energy jet.

10. A tank in accordance with claim 6, further comprising: a partition dividing the tank volume into a main chamber and a secondary chamber; a fore-pump in an area near said bottom of said main chamber and a line, within said tank, leading from said fore-pump into said secondary chamber, said pump being provided as a main pump, disposed in said secondary chamber; said pipeline system comprising a line led out of said tank from said main pump; and an overflow leading from said secondary chamber into the main chamber, an upwardly directed exit area of said line leading from said fore-pump into said secondary chamber and said jet pipe arranged adjacent said partition, leading from an upper area of said secondary chamber into the gas space, and is directed vertically or obliquely downward.

11. A tank in accordance with claim 10, wherein said fore-pump comprises a jet pump based on the ejector principle and a line leading from the main pump to said fore-pump for driving said fore-pump.

12. A tank in accordance with claim 6, wherein said pump provides continuous flow to said jet means.

13. A tank in accordance with claim 6, wherein said pump provides pulsed flow to said jet means.

14. A process for the temperature stratification-free storage of a cryogenic liquid in a thermally insulated aircraft tank of a cryogenic fuel under gravitation and movement conditions which has a liquid volume, in a tank storage space with a clearly delimited liquid level as well as with a gas space above the liquid level, the process comprising the steps of:

pumping liquid from an area of the tank near a bottom of the tank;

feeding the pumped liquid in the form of at least one high-energy jet, said high energy jet being directed toward said liquid level; and generating with said high energy jet a locally limited, highly turbulent mixing zone in an upper area of said liquid volume, wherein during said steps of pumping and feeding said liquid is maintained within the confines of said tank.

15. A process in accordance with claim 14, further comprising providing the tank with a main chamber, which is to be filled with the fuel and is later emptied as a consequence of the fuel consumption, as well as a smaller secondary chamber, which is used as an intermediate storage tank and is extensively filled during the operation of the aircraft; pumping an amount of fuel from the area near the bottom of the main chamber into the secondary chamber, with a direction of flow at the time of its exit into the secondary chamber extending upwardly, and returning an amount of fuel which corresponds at least to part of this amount of fuel in the upper part of the secondary chamber as an amount of overflow into the main chamber, directing said amount of overflow to impact on the liquid level in the form of said at least one high-energy jet.

16. A process in accordance with claim 15 wherein liquid is removed from said tank in the form of continuous fuel consumption with running engines, and an amount of fuel is continuously pumped from the area near the bottom of said main chamber into a secondary chamber, whose instantaneous mass flow ($\dot{m}_5$) is at least 1.1 times the instantaneous fuel consumption ($\dot{m}_2$).

17. A tank for the temperature stratification-free storage of a cryogenic liquid in a tank volume, the liquid having a liquid surface level and a gas space being provided in the tank volume above the liquid surface level, the tank comprising: a thermally insulated outer jacket; a pump within said tank; a pipeline system extending from within said tank to outside said tank for supplying at least one user with cryogenic liquid; a fluidic connection within said tank extending between an area near a bottom of said tank and an area of the gas space, said pump being connected in said fluidic connection; and a jet pipe connected at a top end of said fluidic connection, said jet pipe opening above the liquid surface level and being directed at an angle which is from 45° to 90° with respect to the normal position of the liquid surface level.

18. A tank in accordance with claim 17, wherein an opening of said jet pipe is formed as a convergent nozzle for generating a high energy jet.

19. A tank in accordance with claim 17; further comprising: a partition dividing the tank volume into a main chamber and a secondary chamber; a fore-pump in an area near a bottom of the main chamber and a line, within said tank, leading from the fore-pump into said secondary chamber, said pump being provided as a main pump, disposed in said secondary chamber; said pipeline system comprising a line led out of the tank from said main pump; and an overflow leading from said secondary chamber into the main chamber, an upwardly directed exit area of said line leading from said fore-pump into said secondary chamber and said jet pipe arranged adjacent the partition, leading from an upper area of the secondary chamber into the gas space, and directed vertically or obliquely downward.

20. A tank in accordance with claim 19, wherein said fore-pump comprises a jet pump based on the ejector principle and by a line leading from the main pump to the fore-pump for driving said fore-pump.

\* \* \* \* \*